United States Patent [19]

Levine

[11] 4,206,372
[45] Jun. 3, 1980

[54] REDUCTION OF SPARKLE NOISE IN CCD IMAGERS

[75] Inventor: Peter A. Levine, Trenton, N.J.
[73] Assignee: RCA Corporation, New York, N.Y.
[21] Appl. No.: 16,108
[22] Filed: Feb. 28, 1979
[51] Int. Cl.² .................. G11C 19/28; H03K 3/42; H01L 29/78; H01L 27/14
[52] U.S. Cl. .................. 307/221 D; 307/311; 357/24; 357/30
[58] Field of Search ............... 357/24, 30; 307/221 D, 307/311; 250/211 J

[56] References Cited
U.S. PATENT DOCUMENTS
3,943,545  3/1976  Kim .......................... 357/24

FOREIGN PATENT DOCUMENTS
2259437  8/1975  France ......................... 357/24

OTHER PUBLICATIONS
Rodgers "A 512X320 Element Silicon Imaging Device" IEEE Int. Solid-State Circuits Conf. (2/75), Dig. Tech. Papers, pp. 188–189.

Primary Examiner—Gene M. Munson
Attorney, Agent, or Firm—H. Christoffersen; Samuel Cohen

[57] ABSTRACT

The present invention is applicable to a CCD imager of the field transfer type employing a single layer electrode structure comprising gate electrodes formed of semiconductor material of one conductivity type separated from one another by semiconductor material of opposite conductivity type. Sparkle is reduced by DC biasing the electrodes in the B register driven by at least one of the multiple phase voltages.

7 Claims, 7 Drawing Figures

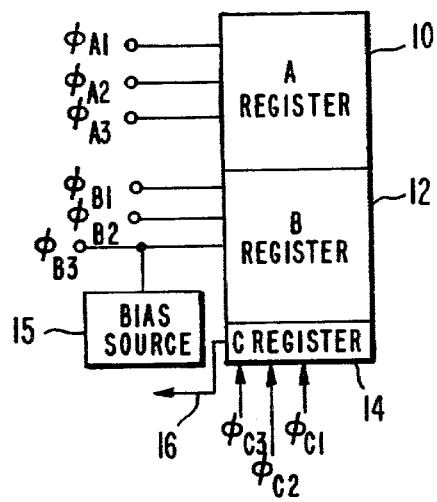
Fig.1.
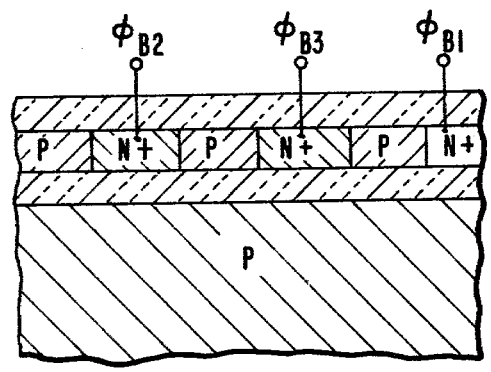
Prior Art Fig.2.
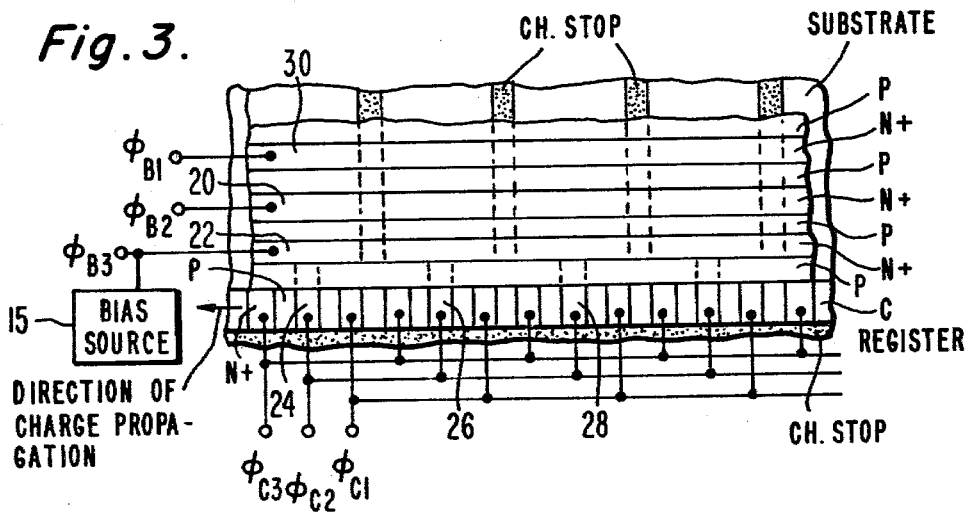
Fig.3.

REDUCTION OF SPARKLE NOISE IN CCD IMAGERS

The present invention relates to charge coupled device (CCD) imagers of the field transfer type and particularly, to the reduction of sparkle noise in imagers of this type which employ single layer electrode structures.

In the drawing:

FIG. 1 is a block diagram of a CCD imager of the field transfer type;

FIG. 2 is a section through the B register of the imager of FIG. 1 illustrating the single layer electrode structure employed;

FIG. 3 is a plan view of a portion of the B register and a portion of the C register of the imager of FIG. 1;

Figure 4:
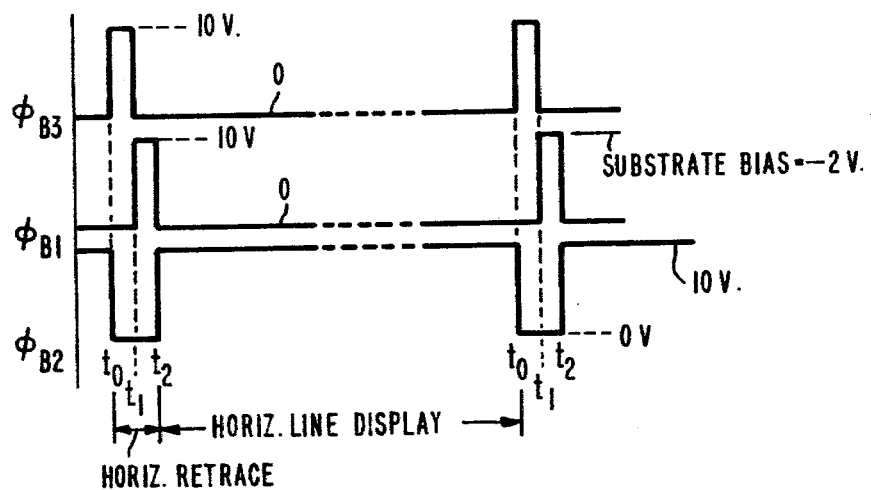
FIG. 4 is a drawing of typical waveforms employed during the operation of the imager of FIGS. 1-3 for an imager using a surface channel B register.

The system of FIG. 1, a CCD imager of the field transfer type, includes a photosensing array 10, known as an A register, a temporary storage array 12, known as a B register, and an output register 14, known as a C register. Except for the bias source 15, this form of imager is well known. The B and C registers are masked, that is, means (not shown) are provided for preventing a radiant energy image from reaching either register.

The A and B registers have channel stops (those in the B register are illustrated, in part, in FIG. 3) extending in the column direction to isolate the channels (the columns of the CCD) from one another. The electrodes (shown in FIG. 2) are of the single layer type comprising, for example, N+ type regions of polysilicon separated by P-type regions of polysilicon as described in copending U.S. application Ser. No. 651,127 for "Charge Coupled Device Electrode Structure" filed Jan. 21, 1976, by R. L. Rodgers, 3rd and W. N. Henry and assigned to the same assignee as the present application. The imager can be two, three, four or higher phase operated. One such imager employing the single layer electrode structure described is commercially available from RCA Corporation and is known as the SID 52501, or the "Big Sid." This imager is three-phase operated and has 320 columns and 512 rows (256 in the A register and 256 in the B register).

The operation of the array of FIG. 1 is well understood. Dduring the so-called integration time, a scene or other image is projected onto the A register. The light or other radiant energy of the image causes charges to be produced at the various locations of the A register, in accordance with the light intensity reaching the respective locations.

Upon the completion of the integration time (e.g. during the vertical blanking interval of commercial television), the charge signals which have accumulated (a "field") are transferred, in parallel, in the column direction from the A to the B register by the application of the multiple phase voltages $\phi_{A1} \ldots \phi_{AN}$ and $\phi_{B1} \ldots \phi_{BN}$, where N is an integer equal to the number of phases employed. The charges subsequently are transferred, a row at a time, from the B register to the C register, and after each row of charges reaches the C register, it is serially shifted out of the C register in response to the shift voltages $\phi_{C1} \ldots \phi_{CN}$. The transfer of charges from the B to the C register occurs during a relatively short time (the horizontal retrace time of commercial television, which is about 10 $\mu$s) and the serial shifting of the C register occurs at relatively high speed (during the horizontal line display time of commercial television). During the transfer of a field from the B to the C register, a new field may be integrated in the A register.

FIG. 3 shows, in more detail, a portion of the B register which is close to the C register and a portion of the C register of FIG. 1. During the horizontal line display time, the charges which previously have been shifted into the C register are propagated at high speed out of the C register by the multiple phase voltages $\phi_{C1}$, $\phi_{C2}$ and $\phi_{C3}$. During this display time (about 53.5 $\mu$s), which is roughly 84% of the horizontal line time (63.5 $\mu$s), the next row of charges is stored in the substrate region beneath the $\phi_{B2}$ electrode 20 of the B register. During this period $t_2-t_0$ in FIG. 4, the $\phi_{B2}$ voltage is a positive value such as +10 volts and the $\phi_{B1}$ and $\phi_{B3}$ voltages are of a less positive value such as 0 volts. The P-type substrate may be biased at a value such as $-2$ or $-3$ volts and is illustrated in FIG. 4 at $-2$ volts.

Upon the completion of the readout of the C register, it is necessary to transfer a new row of charges into the C register. This is accomplished by making the $\phi_{B2}$ voltage low while concurrently making the $\phi_{B3}$ voltage high at $t_0$ as shown in FIG. 4. It is to be understood that the drawings in FIG. 4 are schematic as, in practice, $\phi_{B3}$ is increasing while $\phi_{B2}$ is still in an "on" condition and the leading and lagging edges of the other waveforms are similarly overlapping. During this period, $\phi_{C2}$ is high at a value such as +10 volts and $\phi_{C1}$ and $\phi_{C3}$ are low at a value such as zero volts. At time $t_1$, $\phi_{B3}$ goes low and this causes the transfer of the entire row of information which was temporarily stored beneath $\phi_{B3}$ electrode 22 to the substrate regions beneath the $\phi_{C2}$ electrodes 24, 26, 28 and so on. At time $t_1$, $\phi_{B1}$ goes high and at time $t_2$, $\phi_{B1}$ goes low and $\phi_{B2}$ goes high. Thus at time $t_2$, the next row of charges transfer from the substrate region beneath electrode 30 to the substrate region beneath electrode 20, and also the multiple phase $\phi_{C1}$, $\phi_{C2}$, $\phi_{C3}$ can start to alternate to shift the contents of the C register out of the C register.

The serially occurring charges shifted out of the C register (at 16, FIG. 1) are translated to voltages and these may correspond to the video signals of television. These may be employed to intensity modulate the beam of a kinescope for displaying on its screen the image read from the imager.

It is found, in a system of this kind, that if no precautions are taken, the displayed image often exhibits so-called "sparkle" noise. Sparkle appears randomly at different places on the television screen as small regions which suddenly scintillate or sparkle, that is, which suddenly light up at high intensity and then disappear, sometimes at several places at a time, and which continually reappear in random locations. Although these light spots are minute, they are disturbing. In addition, vertical differentiation appears in the image, that is, one edge, say the upper edge, of a small area of the picture may appear bright and the bottom edge dark, corresponding to overshoot of the video in one sense at the lagging edge of a video pulse and of the opposite sense at the leading edge of this video pulse. This, too, is disturbing to the eye.

The reason for sparkle is not fully understood. The present inventor is certain that it has something to do with charging of the P-type interelectrode regions, hereafter termed the "gaps," of the B register, during the shifting of the charge from the B to the C register, but the complete mechanism is not clear. He believes that a gap (which, in operation, is highly insulating) may become charged when the PN junction separating a P from an N+ region becomes forward biased and may then float when the PN junction becomes reverse biased. The $\phi_{B2}$ waveform is "on" (relatively positive) for roughly 84% of a horizontal line time, and the other two voltages $\phi_{B1}$ and $\phi_{B3}$ employed to operate the B register are each on for only roughly 8% of the time, and all of these voltages are driven between the same limits (0 to +10 volts in the example shown). The present inventor believes that this asymmetry in the waveforms results in asymmetries in the way in which the respective gaps in the B register become charged and that these asymmetries result in the random sparkle effects.

The present inventor also has found that the sparkle is dependent upon the number of shifts a charge packet undergoes in the B register. During the transfer from the B to the C register, the charge packets close to the bottom of the register undergo relatively few transfers and those close to the top of the register, undergo a much larger number of transfers. The bottom of the B register corresponds to the top of the image displayed on a television screen and the top of the B register to the bottom of the image displayed on the screen. It is found, in practice, that most of the sparkle occurs toward the bottom of the displayed image and it is also found that the top of the displayed image exhibits virtually no sparkle. This is consistent with the theory, or perhaps more correctly, this observation lead to the theory.

To test the idea that the sparkle was in some way related to the asymmetry of the multiple phase voltages applied to the B register, the present inventor operated the system using symmetrical $\phi_{B1}$, $\phi_{B2}$ and $\phi_{B3}$ voltages. This made the sparkle disappear. However, this solution to the problem is not entirely practical when applied to an imager operated with commercial television standards. Here, only a small fraction of the time (the horizontal retrace time) is available for the transfer from the B to the C register and it is desirable that during the remainder of a horizontal line time, no transfers take place in the B register. The reason the latter is desirable is that such transfers result in the introduction of noise into the output stage of the C register via the substrate. Therefore, as a practical matter, the loading of the C register must occur during the horizontal retrace time, and during the remainder of the time the charges in the B register should remain stationary. This means that the multiple phase voltages applied to the B register must be asymmetrical.

A solution devised by the present inventor to the sparkle problem is illustrated in FIGS. 1, 3 and 5-7. It is simply to apply a DC bias to one of the multiple phase voltages such as the $\phi_{B3}$ voltage applied to the B register. The bias illustrated is +1 volt which is applied by source 15, and the result of the bias is to cause the $\phi_{B3}$ voltage to swing between +1 and +11 volts rather than between 0 and +10 volts. The substrate bias remains unchanged at −2 volts. The effect of the bias is to increase the depth of the depletion region beneath the $\phi_{B3}$ electrode 22 and the remaining $\phi_{B3}$ electrodes of the B register. The remaining multiple phase voltages $\phi_{B1}$ and $\phi_{B2}$ remain unchanged. Since the reason for the sparkle is not completely understood, the reason why this addition of a DC bias to only one of the electrodes eliminates or at least greatly reduces the sparkle also is not completely understood. It is thought, however, that in some way the bias reduces the charges produced in the gaps or reduces the asymmetry in the charging of the gaps. It is found that the bias voltage can be small, in the range of 1 to 2 volts or so, or even somewhat more. However, if the bias is made too positive, this increases the depth of the potential well which is formed during the most positive part of the pulse and also reduces the height of the barrier which forms when the voltage waveform goes to its least positive level. The latter, it is thought, results in the trapping of some charge, that is, all of the charge may not spill out of the potential well beneath a $\phi_{B3}$ electrode when $\phi_{B3}$ goes the least positive. This results in a reduction in vertical resolution and is undesirable. Accordingly, in actually making the adjustment, a potentiometer is varied to a point just beyond that at which the sparkle is eliminated and this may be a bias of a volt or two.

Figure 6:
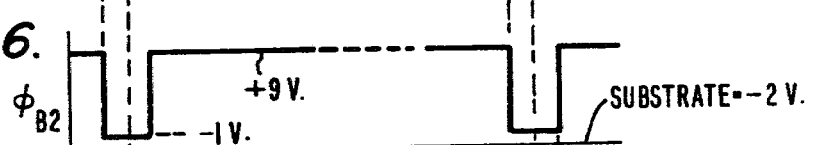
Figure 7:
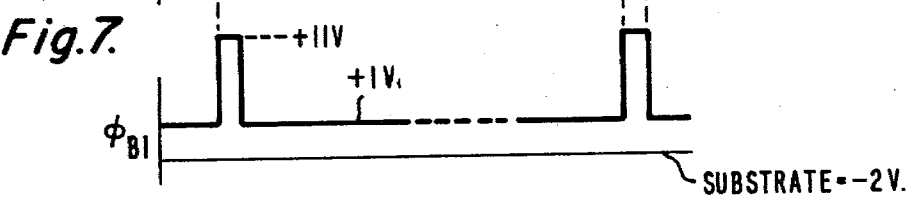

FIG. 6 illustrates another solution to the problem. It is to bias the $\phi_{B2}$ electrodes in the opposite esnse. Thus, rather than having $\phi_{B2}$ vary between limits of 0 and +10 volts, $\phi_{B2}$ is instead driven between levels of −1 volt and +9 volts. The other two voltages, $\phi_{B1}$ and $\phi_{B3}$ remain the same, that is, they swing between the limits 0 and 10 volts and the substrate bias remains the same. Note that for the surface channel B register illustrated, the $\phi_{B2}$ voltage at its most negative value should be more positive than the substrate.

There are also other modes of operation which are possible. In one, both the $\phi_{B1}$ and $\phi_{B3}$ electrodes are biased, say by +1 volt, so that each swings between +1 and +11 volts while the $\phi_{B2}$ voltage remains unchanged, that is, it swings between 0 and 10 volts, and the substrate bias remains unchanged. In another, shown in FIG. 7, the $\phi_{B1}$ electrodes are biased by +1 volts and the $\phi_{B2}$ and $\phi_{B3}$ voltages remain unchanged.

Figure 5:
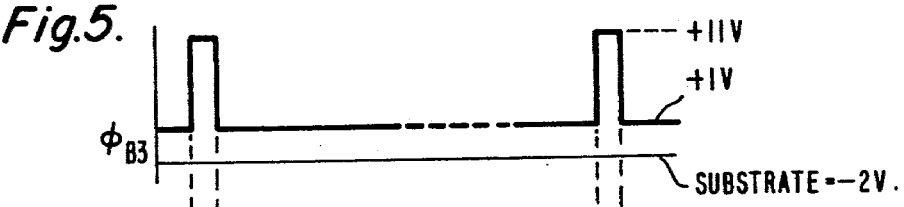
FIGS. 5, 6 and 7 illustrate ways of changing the waveforms to eliminate or at least substantially to reduce the sparkle noise.

While a number of different alternative modes of operation have been described, it has been found, in the samples of imagers (chips) which were tested, that the one illustrated in FIG. 5 worked best. In this mode of operation, only the $\phi_{B3}$ electrodes are biased, as shown. It is noted that the $\phi_{B3}$ electrodes include electrode 22 which is immediately adjacent the C register and between it and electrode 20 under which the following row of charges is being stored during the time the preceding row of charges is being read from the C register. The reason why biasing only the $\phi_{B3}$ electrodes works best is not understood.

The other modes of operation described have also been tested and also found to eliminate or at least to greatly reduce sparkle. However, in some cases the adjustments have to be made very carefully; in some cases vertical resolution is somewhat impaired; and in some cases of chips with defects, these defects become more pronounced in the displayed image. Again, the reasons why biasing both the $\phi_{B1}$ and $\phi_{B3}$ electrodes or only the $\phi_{B1}$ or only $\phi_{B2}$ electrode, all as previously discussed, does not appear to work as well as biasing only the $\phi_{B3}$ electrodes is not understood.

The various bias methods just discussed may be employed only during the B-to-C transfer time or, alternatively, the bias may remain on continuously, that is, during the A-to-B register transfer time as well as the B-to-C register transfer time. Employing an offset bias or offset biases such as described during the A-to-B transfer time does not appear to degrade performance and it is found successfully to remove sparkle noise.

While for purposes of the present explanation, the CCD imager has been illustrated in terms of a surface channel B register and a surface channel C register, it is applicable also to a surface channel B register and a buried channel C register such as described in copending application Ser. No. 754,690, by W. F. Kosonocky and R. L. Rodgers, 3rd, for "CCD Imagers," filed Dec. 27, 1976, and assigned to the same assignee as the present application. When using a buried channel B register, the sparkle is relatively low, even when using the waveforms of FIG. 4 so, as far as can be ascertained, the improvement obtained using the biasing techniques described herein would be minor.

While a three-phase system is illustrated, the invention is equally applicable to three or four or higher phase systems and the claims are intended to be generic to all such systems.

What is claimed is:

1. In a charge-coupled device (CCD) imager of the field-transfer type comprising:
    a CCD A register including a substrate formed with channels extending in a column direction, the opposite edges of each channel being defined by potential barriers in the substrate for confining any charge which may be present in a channel to the channel, said A register also having electrodes extending in a row direction substantially orthogonal to said column direction, over said channels, responsive to applied voltages for the storage in and transfer of charges along said channels, said register for producing and storing charge signals in response to a radiation image projected onto said register;
    a CCD B register coupled to said A register and into which a field of charge signals from said A register may be shifted for temporary storage in said B register, said B register including a substrate formed with channels aligned with corresponding channels of the A register, the opposite edges of each such channel in said B register also being defined by potential barriers in the substrate for confining any charge which may be present in a channel to that channel, said B register having electrodes extending in the row direction over the channels of said B register responsive to applied multiple phase voltages for the storage in and transfer of charge along the channels of said B register, said electrodes being of the single layer type and comprising semiconductor material of one donductivity type and being separated from one another by semiconductor material of opposite conductivity type;
    a CCD C register including a semiconductor formed with a channel extending in the row direction and having opposite edge regions defined by potential barriers in the semiconductor extending in the row direction for confining any charge which may be present in said channel to said channel, said channel of said C register being coupled to the channels of said B register for receiving charge signals, in parallel from said B register, and said C register also including electrodes extending in the column direction over its channel for the storage in and transfer of charge along the channel of said C register;
    said multiple phase voltages applied to said electrodes of said B register being asymmetrical in the sense that during the relatively longer time charge is being transferred along said C register, one of the multiple phase voltages is on, that is, is of a sense and amplitude to cause the electrodes to which it is applied to produce potential wells and the other of said multiple phase voltages applied to said B register are off, that is, are of a sense and amplitude to create potential barriers beneath the electrodes to which they are applied, and during the relatively shorter time when charge is being propagated from the B to the C register, said one multiple phase voltage changes in amplitude to a value to create a potential barrier beneath the electrodes to which it is applied and said other multiple phase voltages change in amplitude in a sense to propagate charge toward said C register; the improvement comprising:
    means for adding a direct current voltage bias component to at least one of said multiple phase voltages applied to said B register of a sense to reduce sparkle noise.

2. In a CCD as set forth in claim 1, said means for adding a direct current bias component comprising means for doing so to at least one of said other multiple phase voltages applied to said B register of a sense to increase the depth of the depletion region beneath the electrodes to which it is applied.

3. In a CCD as set forth in claim 2, said multiple phase voltages applied to said B register comprising N phases of voltage, where N is an integer greater than 1.

4. In a CCD as set forth in claim 3, N being an integer greater than 2, and said means for adding a direct current component comprising means for doing so to all of said other multiple phase voltages applied to said B register of a sense to increase the depth of the depletion region beneath the electrodes to which they are applied.

5. In a CCD as set forth in claim 2, said means for adding a direct current bias component comprising means for doing so to only one of said other multiple phase voltages applied to said B register of a sense to increase the depth of the depletion region beneath the electrodes to which it is applied.

6. In a CCD as set forth in claim 5, the electrodes in said B register to which said direct current bias component is applied including the electrode in said B register which is immediately adjacent to said C register.

7. In a CCD as set forth in claim 1, said means for adding a direct current bias component comprising means for doing so to said one multiple phase voltage applied to said B register of a sense to decrease the depth of the depletion region beneath the electrodes to which it is applied.

* * * * *